United States Patent
Kumar et al.

(10) Patent No.: US 9,625,651 B2
(45) Date of Patent: Apr. 18, 2017

(54) INTEGRATED MULTISTAGE TAPER COUPLER FOR WAVEGUIDE TO FIBER COUPLING

(71) Applicant: Skorpios Technologies, Inc., Albuquerque, NM (US)

(72) Inventors: Nikhil Kumar, Albuquerque, NM (US); Guoliang Li, Albuquerque, NM (US); Stephen Krauslick, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 141 days.

(21) Appl. No.: 14/615,942

(22) Filed: Feb. 6, 2015

(65) Prior Publication Data

US 2015/0219853 A1 Aug. 6, 2015

Related U.S. Application Data

(60) Provisional application No. 61/936,799, filed on Feb. 6, 2014.

(51) Int. Cl.
  *G02B 6/30* (2006.01)
(52) U.S. Cl.
  CPC .................. *G02B 6/305* (2013.01)
(58) Field of Classification Search
  CPC ...................................... G02B 6/305
  See application file for complete search history.

(56) References Cited

U.S. PATENT DOCUMENTS

| | | |
|---|---|---|
| 6,690,857 B2 | 2/2004 | Zhao et al. |
| 2004/0017962 A1 | 1/2004 | Lee et al. |
| 2004/0264840 A1 | 12/2004 | Mule et al. |
| 2005/0058416 A1 | 3/2005 | Lee et al. |
| 2005/0123244 A1 | 6/2005 | Block et al. |
| 2006/0115215 A1 | 6/2006 | Liu |
| 2008/0266639 A1 | 10/2008 | Melloni et al. |
| 2010/0040327 A1* | 2/2010 | Deki ............... G02B 6/305 385/28 |
| 2010/0247037 A1 | 9/2010 | Little |
| 2011/0158584 A1 | 6/2011 | Popovic |

(Continued)

FOREIGN PATENT DOCUMENTS

| | | |
|---|---|---|
| EP | 2544319 B1 | 1/2013 |
| WO | 2010-033435 A2 | 3/2010 |

OTHER PUBLICATIONS

International Search Report, dated May 11, 2015, for International Patent Application PCT/US2015/014801 with the International filing date of Feb. 6, 2015, 3 pages.

(Continued)

*Primary Examiner* — Jerry Rahll
(74) *Attorney, Agent, or Firm* — Kilpatrick Townsend & Stockton LLP

(57) ABSTRACT

A waveguide coupler has a compression region and an expansion region for coupling light between a silicon waveguide and an optical fiber. The compression region receives light from the silicon waveguide and compresses an optical mode of the light. Light is transmitted from the compression region to an expansion region. The expansion region expands the light to have a larger cross section. Light is then transmitted to the optical fiber.

19 Claims, 11 Drawing Sheets

(56) References Cited

U.S. PATENT DOCUMENTS

2011/0205660 A1 8/2011 Komura et al.
2012/0093456 A1* 4/2012 Taillaert ............... G02B 6/1228
                                                                385/14

OTHER PUBLICATIONS

Written Opinion, dated May 11, 2015, for International Patent Application PCT/US2015/014801 with the International filing date of Feb. 6, 2015, 9 pages.
Barkai, A., et al., "Efficient Mode Converter for Coupling Between Fiber and Micrometer Size Silicon Waveguides." *IEEE*. 2007 . pp. 49-51.
Khilo, A., et al., "Efficient Planar Fiber-to-Chip Coupler Based on Two-Stage Adiabatic Evolution." *Optics Express*. vol. 18, No. 15, Jul. 2010, pp. 15790-15806.
Park, H. et al., "A Fiber-to-Chip Coupler Based on Si/SiON Cascaded Tapers for Si Photonic Chips" *Optics Express*. vol. 21, No. 24, Dec. 2013, pp. 29313-29319.
Yamada, K., "Chapter 1: Silicon Photonic Wire Waveguides: Fundamentals and Applications." *Silicon Photonics II*, Topics in Applied Physics 119, 1-29 (2011).
ISR/WO mailed on Nov. 16, 2012 for International Patent Application No. PCT/US2012/052913 filed on Aug. 29, 2012, all pages.
U.S. Non-Final Office Action mailed on Sep. 2, 2014 for U.S. Appl. No. 13/597,117, filed Aug. 28, 2012, all pages.

* cited by examiner

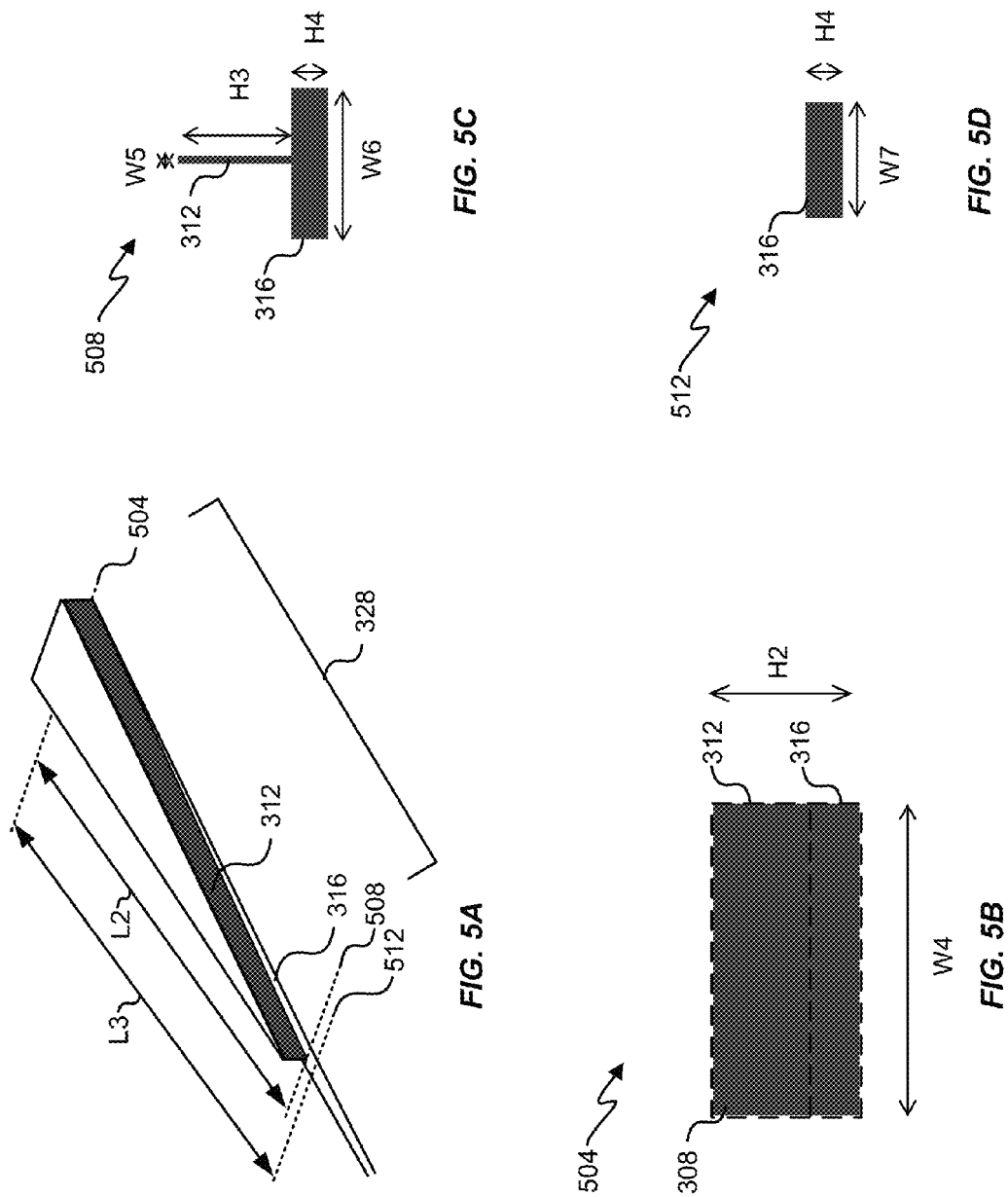

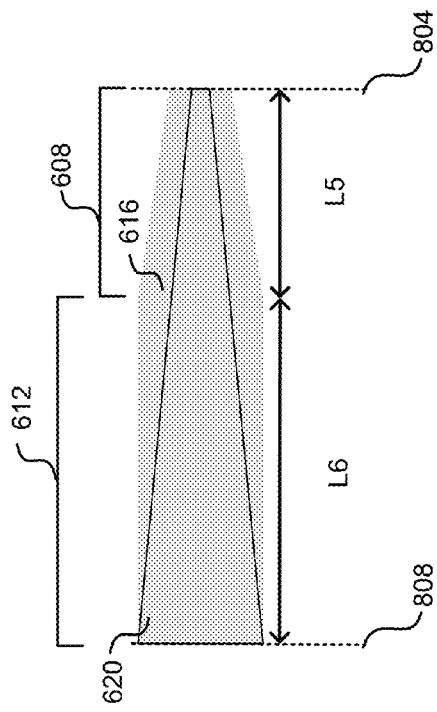
FIG. 8B
FIG. 8A
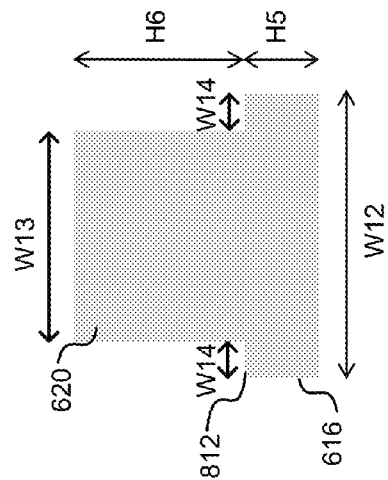
FIG. 8E
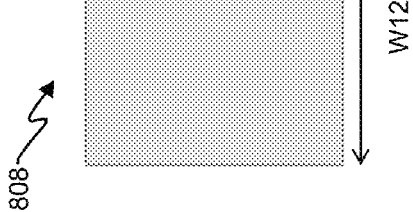
FIG. 8D
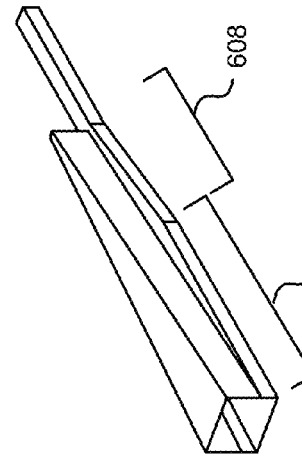
FIG. 8C

US 9,625,651 B2

INTEGRATED MULTISTAGE TAPER COUPLER FOR WAVEGUIDE TO FIBER COUPLING

CROSS-REFERENCES TO RELATED APPLICATIONS

This application claims priority to U.S. Provisional Patent Application No. 61/936,799, filed on Feb. 6, 2014, entitled "Integrated Multistage Taper Coupler For Waveguide To Fiber Coupling," the disclosure of which is hereby incorporated by reference in its entirety for all purposes.

BACKGROUND OF THE INVENTION

Optical waveguiding elements convey light from one point to another through an optically transparent, elongated structure by modal transmission, total internal reflection, and/or total reflectorization. An optical waveguide directs radiation in the visible, infrared, and/or ultra-violet portions of the radiation spectrum by total internal reflection. An optical coupler is used to connect optical elements.

BRIEF SUMMARY OF THE INVENTION

This application relates to coupling a semiconductor waveguide to an optical fiber. More specifically, and without limitation, to coupling a thick silicon waveguide to an optical fiber using one or more multistage tapers.

Embodiments of a waveguide coupler for transmitting light between a thick silicon waveguide and an optical fiber is disclosed. The coupler comprises a compression region and an expansion region. The compression region is operable to receive an optical beam from a semiconductor waveguide; compress the optical beam to have a smaller cross section compared to light confined in the semiconductor waveguide; and transmit the optical beam to the expansion region. The expansion region is configured to the optical beam from the compression region; expand the optical beam to have a larger cross section compared to light confined in the semiconductor waveguide; and transmit the optical beam to the optical fiber. In some embodiments, the compression region comprises a shoulder and a ridge, and the shoulder and the ridge both compress the optical beam. In some embodiments, the ridge of the compression region terminates at a first tip having a width equal to or less than 225 nanometers and the shoulder of the compression region terminates at a second tip having a width less than or equal to 225 nanometers. In some embodiments, the second tip has a width less than or equal to 175 nanometers. In some embodiments, the expansion region comprises a first part, wherein the first part overlaps at least a portion of the compression region. In some embodiments, the first part and the at least a portion of the compression region are made of different materials. In some embodiments, the first part has a cross section between 2.5 microns and 3.5 microns and has a height between 2.5 microns and 3.5 microns. In some embodiments, the expansion region adiabatically expands the optical beam received from the compression region as the optical beam is guided to the optical fiber. In some embodiments, the compression region adiabatically compresses the optical beam received from the semiconductor waveguide. In some embodiments, the compression region comprises a first material having a first index of refraction; the expansion region comprises a second material having a second index of refraction; and the first index of refraction is greater than the second index of refraction.

An expansion region for use in a coupler for guiding light between a thick silicon waveguide and an optical fiber is disclosed. The expansion region comprises a shoulder and a ridge. The shoulder has a first part, a second part, and a third part. The first part is not tapered; the second part is tapered to laterally expand or compress light; the second part is disposed between the third part and the first part; and the shoulder in the third part is not tapered. The ridge extends over top of the second part and the third part; and the ridge tapers to laterally expand or compress light. In some embodiments, the expansion region has refractive index that matches a refractive index, or effective refractive index, of the optical fiber. In some embodiments, the expansion region comprises SiON or SiN. In some embodiments, the first part of the shoulder overlaps a portion of a compression region of the coupler.

A method for coupling a semiconductor waveguide to an optical fiber is disclosed. The method comprises: transmitting a beam of light from a waveguide into an optical coupler; compressing the beam of light received from the waveguide in a first region of the optical coupler; expanding the beam of light in a second region of the optical coupler after compressing the beam of light in the first region; and transmitting the beam of light from the optical coupler to an optical fiber after expanding the beam of light in the second region of the optical coupler. In some embodiments, the second region overlaps at least a portion of the first region; the first region comprises a first material having a first index of refraction; the second region comprises a second material having a second index of refraction; and the first index of refraction is greater than the second index of refraction.

A v-groove in silicon for positing an optical fiber to a coupler used to guide light between the optical fiber and a silicon waveguide is disclosed. The v-groove comprises two planes forming a v-groove in silicon, wherein the two planes are formed by etching along crystal planes of the silicon; one or more metal pieces embedded within the silicon; and a resistor embedded within the silicon, wherein the resistor is operable to melt the one or more metal pieces when current is injected into the resistor, thereby welding the metal piece to metal on the optical fiber.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 5A depicts a perspective view an embodiment of a first portion of a second segment of the compression region.

FIG. 5B depicts a cross section of an embodiment of an input end 504 of the first portion of the second segment of the compression region.

FIG. 5C depicts a cross section of an embodiment of an output end of the first portion of the second segment of the compression region.

FIG. 5D depicts an embodiment of an additional cross section of the first portion of the second segment of the compression region.

FIG. 8A depicts a perspective view an embodiment of the second part and the third part of the expansion region.

FIG. 8B depicts a top view of an embodiment of the second part and the third part of the expansion region.

FIG. 8C depicts a cross section of an embodiment of an input end of the second part of the expansion region.

FIG. 8D depicts a cross section of an embodiment of an output end of the third part of the expansion region.

FIG. 8E depicts a cross section of another embodiment of the output end of the third part of the expansion region.

In the appended figures, similar components and/or features may have the same reference label. Where the reference label is used in the specification, the description is applicable to any one of the similar components having the same reference label.

DETAILED DESCRIPTION OF THE INVENTION

Figure 1:
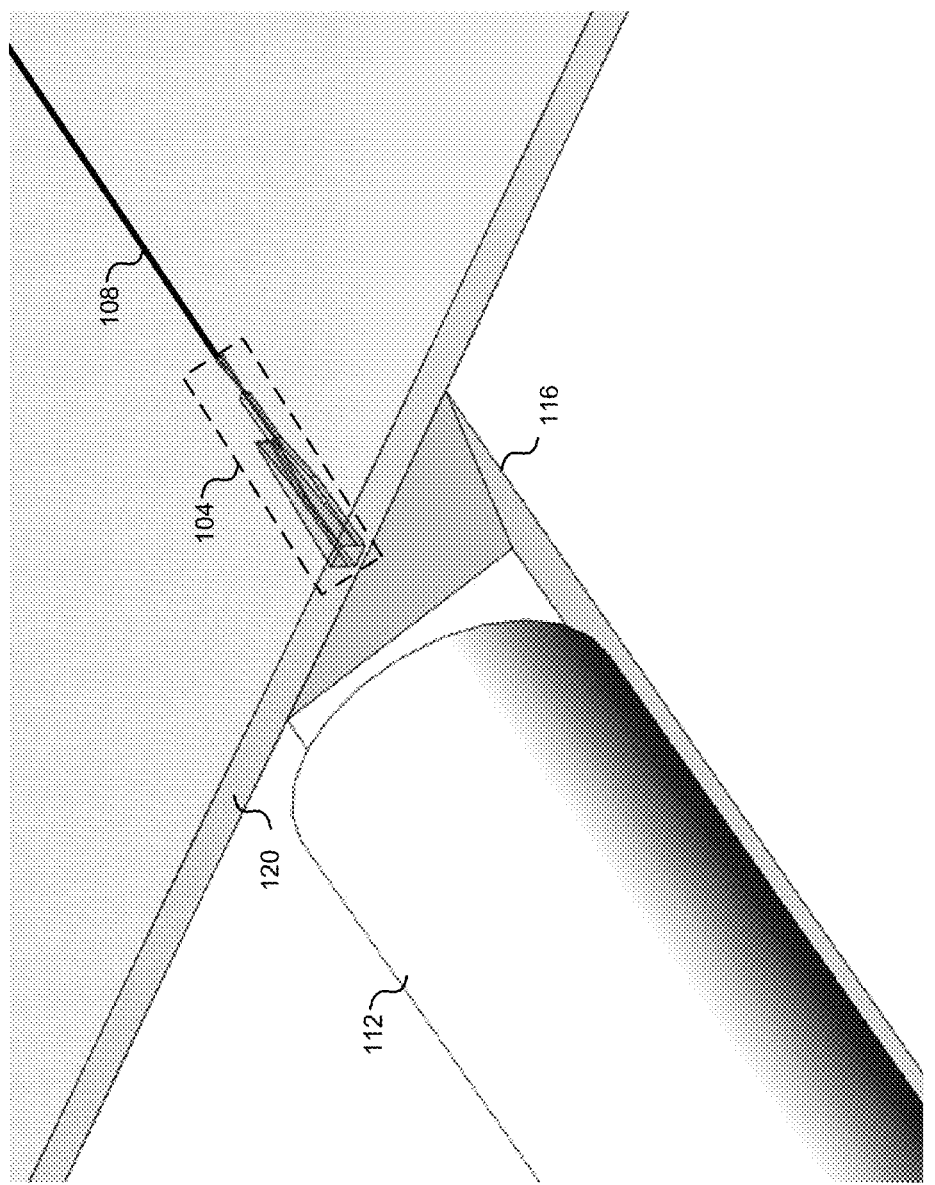
FIG. 1 depicts a simplified view of an embodiment of an optical coupler connecting a semiconductor waveguide to an optical fiber.

Referring to FIG. 1, a simplified view of an embodiment of an optical coupler, coupler 104, connecting a waveguide 108 to an optical fiber 112 is shown. The optical fiber 112 is aligned using a v-groove 116. The coupler 104 terminates at a wafer face 120. In some embodiments, a second waveguide and/or other elements are disposed between the coupler 104 and the wafer face 120 (the waveguide 108 being the first waveguide).

In some embodiments, the coupler 104 is formed on a substrate, such as a SiO2 wafer or a silicon-on-insulator (SOI) wafer. An SOI wafer comprises a substrate, an insulating layer (e.g., buried oxide or BOX), and a device layer. The device layer of the SOI wafer is crystalline silicon. In some embodiments, the coupler 104 and/or the waveguide 108 are formed in the device layer of the SOI wafer. In some embodiments, the coupler 104 and/or the waveguide 108 are formed on other wafers that are used in semiconductor manufacturing (e.g., a GaAs, InP, glass, or garnet substrates). Tops and/or sides of the coupler 104 can be left exposed to air, or the coupler 104 can be covered. For example, in some embodiments the coupler 104 is cladded with SiO2, an epoxy, and/or a photoresist.

In some embodiments, the waveguide 108 is made of crystalline semiconductor material. For example, the waveguide 108 is made of crystalline silicon, III-V material (e.g., GaAs, InP, InGaP, etc.), or II-VI material. In some embodiments, the waveguide 108 is made in thick silicon (e.g., the waveguide 108 has a height ranging between 0.4 microns and 3.5 microns). Though embodiments in this description are shown with a semiconductor waveguide having a height of around 1.5 microns, dimensions of the coupler 104 can be altered to accommodate varying sizes of waveguides 108 and/or optical fibers 112. For example, if the waveguide 108 has a height of 3.5 microns, an additional stage may be used. In some embodiments, a length of an element is determined, at least partially, by a height and width the element. In some embodiments, dimensions are given for a coupler 104 for transmitting light in a range between 1200 nm and 1600 nm (e.g., 1310 nm and 1550 nm) because there are applications for fiber-optic communication in that range. In some embodiments, the waveguide 108 is a ridge waveguide having a lower portion wider than an upper portion. In some embodiments, other elements are optically coupled with the waveguide 108 (e.g., a semiconductor laser, a modulator, a rotator, etc.).

In some embodiments, the optical fiber 112 is coupled to the wafer face 120. In some embodiments, the optical fiber 112 is optically coupled with the coupler 104 (e.g., another waveguide and/or index matching material being between the optical fiber 112 and the wafer face 120. In FIG. 1, an embodiment of the optical fiber 112 is sitting in the v-groove 116. In some embodiments, the v-groove 116 is etched along crystal planes of silicon or other material (e.g., III-V material). A depth and placement of the v-groove 116 is such that a core of the optical fiber 112 aligns with a center of an output cross section of the coupler 104.

FIG. 1 shows the optical fiber 112 and the coupler 104 aligned along a common axis (i.e., perpendicular to a plane formed along the wafer face 120, wherein the wafer face 120 is formed by cleaving crystalline silicon). A long axis of the coupler 104 is formed along a length of the coupler 104. In some embodiments, the long axis of the coupler 104 is less than 90 degrees in relation the wafer face 120. Having the long axis of the coupler 104 at an angle of less than 90 degrees helps reduce reflections from a face of the optical fiber 112 and/or a face of the coupler 104. In some embodiments, the optical fiber 112 is aligned at an angle less than then 90 degrees in relation to the wafer face 120. In some embodiments, both the optical fiber 112 and the coupler 104 are aligned so that the optical fiber 112 and the long axis of the coupler 104 are at off-normal angles to the wafer face 120 and/or off axis from each other.

Figure 2:
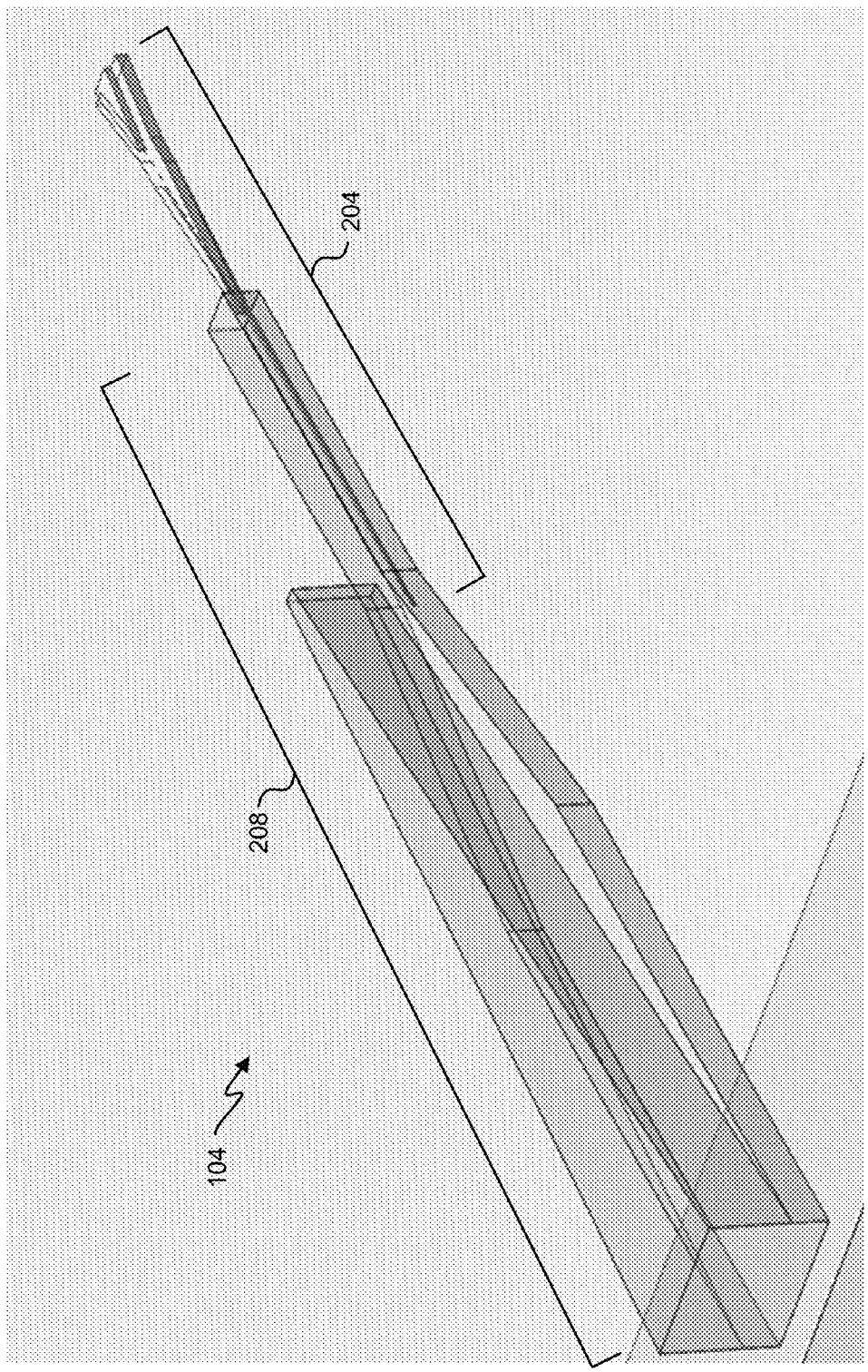
FIG. 2 depicts a simplified view of an embodiment of the optical coupler having a compression region and an expansion region.

Referring next to FIG. 2, a simplified view of an embodiment of the coupler 104 having a first region (a compression region 204) and a second region (an expansion region 208) is shown. This description is written such that light is travelling from the waveguide 108, to the coupler 104, and to the optical fiber 112. A person skilled in the art will recognize that light can also travel from the optical fiber 112, to the coupler 104, and to the waveguide 108. But for explanation purposes, light will be described as propagating from the waveguide 108, to the coupler 104, and then to the optical fiber 112.

Light from the waveguide 108 enters the coupler 104 at the compression region 204. The compression region 204 reduces a height and/or width of an optical mode of light travelling through the compression region 204. The height and width of the optical mode are measured along axes perpendicular to beam propagation; the height of the optical mode being measured in a vertical direction and width being measured in a horizontal (lateral) direction. The light is compressed to have a smaller cross section than when confined to the waveguide 108.

The expansion region 208 expands the beam to couple with the optical fiber 112. It was discovered that loss could be reduced by first constricting an optical beam before expanding an optical beam in a coupler 104. In some embodiments, dimensions of the compression region 204 and the expansion region 208 are given to reduce and/or minimize a total length of the coupler 104 while maintaining adiabatic constriction and expansion of the optical beam.

Figure 3:
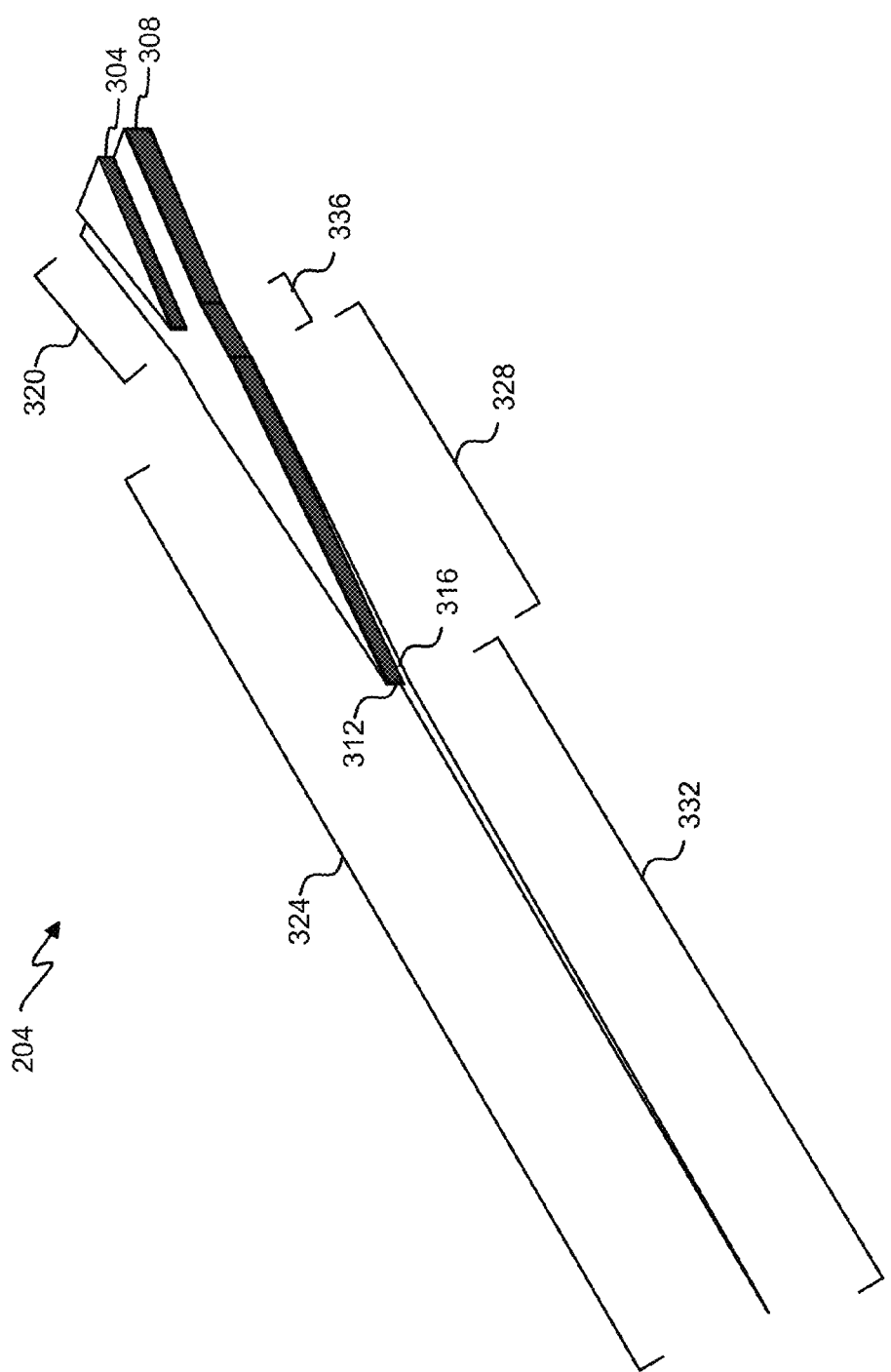
FIG. 3 depicts a simplified view of an embodiment of the compression region of the optical coupler.

In FIG. 3, a simplified view of an embodiment of the compression region 204 is shown. The compression region 204 of the coupler 104 has multiple stages, which include a ridge 304 and a shoulder 308. The shoulder 308 of the compression region 204 is further divided into an upper shoulder 312 and a lower shoulder 316. Longitudinally, the compression region 204 comprises a first segment 320 and a second segment 324.

The First segment 320 of the compression region 204 is optically coupled (directly or indirectly) with the waveguide 108. Both the ridge 304 of the compression region 204 and the shoulder 308 of the compression region 204 taper (narrowing taper for beam propagation from the waveguide 108 to the optical fiber 112) in the first segment 320 of the compression region 204. Taper means that a width of an element increases or decreases as a function of length.

The second segment 324 of the compression region 204 comprises the shoulder 308 of the compression region 204 but not the ridge 304 of the compression region 204. In the second segment 324, the upper shoulder 312 narrows more quickly than the lower shoulder 316. The second segment 324 is further divided into a first portion 328 and a second portion 332 of the second segment 324 of the compression region 204. In the first portion 328, the upper shoulder 312 tapers more quickly than the lower shoulder 316. The second portion 332 of the second segment 324 of the compression region 204 comprises the lower shoulder 316 but not the upper shoulder 312. The lower shoulder 316 in the second portion 332 continues to taper. In some embodiments, the lower shoulder 316 in the second portion 332 does not taper.

In some embodiments, the compression region 204 comprises a third segment 336 between the first segment 320 of the compression region 204 and the second segment 324 of the compression region 204. The third segment 336 of the compression region 204 does not taper. In some embodiments, the third segment 336 of the compression region 204 is used in adiabatically transferring the optical beam from the ridge 304 of the compression region 204 to the shoulder 308 of the compression region 204, after the ridge 304 of the compression region 204 terminates. In some embodiments the third segment 336 is less than 20 µm, less than 10 µm, and/or less than 5 µm. In some embodiments, the third segment 336 is greater than 20 µm, greater than 10 µm, and/or greater than 5 µm.

In some embodiments, the compression region 204 of the coupler 104 is made of the same or similar material as the waveguide 108 (e.g., crystalline silicon). In some embodiments, the compression region 204 is formed while In this disclosure, a near end is used to refer to an end of a section or stage of the coupler 104 that is closer than a far end of the section or stage to the waveguide 108. And a far end is used to refer to an end of a section or stage of the coupler 104 that is closer to the optical fiber 112 than a corresponding near end.

Figure 4B:
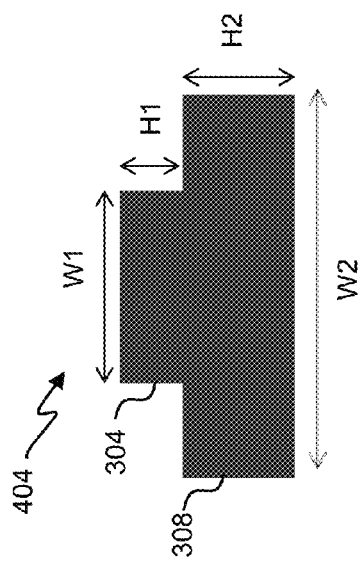
FIG. 4B depicts a cross section of an embodiment of an input end of the first segment of the compression region.
Figure 4C:
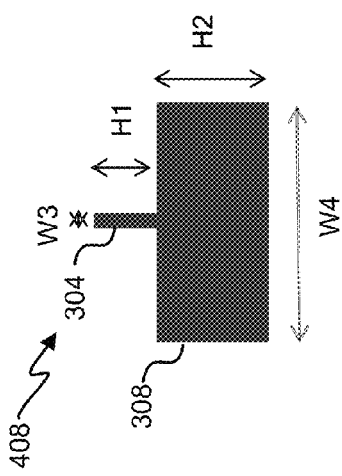
FIG. 4C depicts a cross section of an embodiment of an output end of the first segment of the compression region.
Figure 4A:
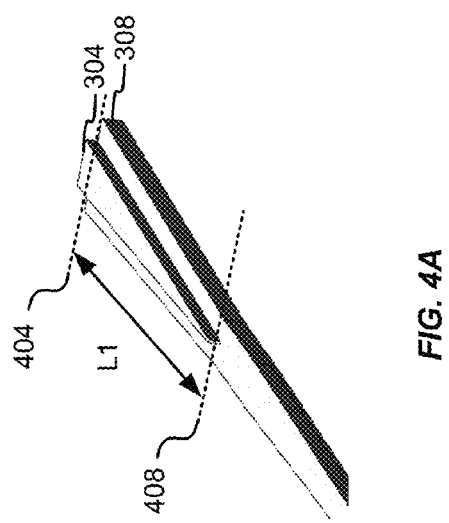
FIG. 4A depicts a perspective view an embodiment of a first segment of the compression region.

Referring next to FIGS. 4A-4C, views of an embodiment of the first segment 320 of the compression region 204 are shown. FIG. 4A depicts a perspective view an embodiment of the first segment 320 of the compression region 204. The first segment 320 of the compression region 204 has a near end 404 and far end 408. The first segment 320 is shown comprising the ridge 304 of the compression region 204 and the shoulder 308 of the compression region 204. Both the ridge 304 of the of the compression region 204 and the shoulder 308 of the compression region 204 taper in the first segment 320. In some embodiments, both the ridge 304 of the compression region 204 and the shoulder 308 of the compression region 204 taper at a same rate. For example, the ridge 304 of the of the compression region 204 and the shoulder 308 of the compression region 204 have the same taper slope (change in width over the change in length). A distance between the near end 404 of the first segment 320 and the far end 408 of the first segment 320 is shown as a first length, L1.

FIG. 4B depicts a cross section of an embodiment of the input end 404 of the first segment 320 of the compression region 204. The cross section of the input end 404 of the first segment 320 of the compression region 204 comprises the ridge 304 of the compression region 204 and the shoulder 308 of the compression region 204. At the input end 404 of the first segment 320, the ridge 304 of the compression region 204 has a width, first width W1, and a height, first height H1. In some embodiments, W1 is 1.75 µm±0.05 µm, ±0.10 µm; or 2.00 µm±0.05 µm, ±0.10 µm. At the input end 404 of the first segment 320, the shoulder 308 of the compression region 204 has a width, second width W2, and a height, second height H2.

FIG. 4C depicts a cross section of an embodiment of the output end 408 of the first segment 320 of the compression region 204. The cross section of the output end 408 of the first segment 320 of the compression region 204 comprises the ridge 304 of the compression region 204 and the shoulder 308 of the compression region 204. At the output end 408 of the first segment 320, the ridge 304 of the compression region 204 has a width, third width W3, and a height, first height H1. At the output end 408 of the first segment 320, the shoulder 308 of the compression region 204 has a width, fourth width W4, and a height, second height H2.

Table I below gives sample dimensions of the first segment 320 of the compression region 204.

TABLE I

Sample dimensions of the first segment 320 of the compression region 204

| Dimension | Sample Values | Sample Range |
|---|---|---|
| L1 | 25 µm | 20-30 µm |
| W1 | 1.75, 2 µm | 1.5-2.5 µm |
| W3 | 200 nm | 100-300 nm |
| H1 | 550 nm | 400-650 nm |
| W2 | 6 µm | 1.5-8 µm |
| W4 | 2 µm | 1-3 µm |
| H2 | 950 nm | 800-1050 nm |

FIGS. 5A-5D depict views of an embodiment of the first portion 328 of the second segment 324 of the compression region 204. FIG. 5A depicts a perspective view an embodiment of the first portion 328 of the second segment 324 of the compression region 204. The first portion 328 has a near end 504 and far end 508. The first portion 328 is shown comprising the upper shoulder 312 and the lower shoulder 316. In some embodiments, lower means closer to a substrate and upper is farther from the substrate. Both the upper shoulder 312 and the lower shoulder 316 taper in the first portion 328. In some embodiments, the upper shoulder 312 and the lower shoulder 316 taper at different rates, the upper shoulder 312 tapering faster (narrowing more quickly) than the lower shoulder 316. A distance between the near end 504 of the first portion 328 and the far end 508 of the first portion 328 is shown as a second length, L2. An additional cross section 512 is shown past the output end 508 of the first portion 328 of the second segment 324. A distance between the additional cross section 512 of the first portion 328 and the near end 504 of the first portion 328 is shown as a third length, L3.

FIG. 5B depicts a cross section of an embodiment of the input end 504 of the first portion 328 of the second segment 324 of the compression region 204. The cross section of the input end 504 of the first portion 328 comprises the upper shoulder 312 and the lower shoulder 316. At the cross section of the input end 504 of the first portion 328, upper shoulder 312 and the lower shoulder 316 are indistinguishable from each other and form the shoulder 308 of the compression region 204. At the input end 504 of the first portion 328, the shoulder 308 of the compression region 204 has a width, fourth width W4, and a height, second height H2.

FIG. 5C depicts a cross section of an embodiment of the output end 508 of the first portion 328 of the second segment 324 of the compression region 204. The cross section of the output end 508 of the first portion 328 comprises the upper shoulder 312 and the lower shoulder 316. At the output end 508 of the first portion 328, the upper shoulder 312 has a width, fifth width W5, and a height, third height H3. At the output end 508 of the first portion 328, the lower shoulder 316 has a width, sixth width W6, and a height, fourth height H4.

FIG. 5D depicts an embodiment of the additional cross section 512 of the first portion 328 of the second segment 324 of the compression region 204. The additional cross section 512 of the first portion 328 comprises the lower shoulder 316 and not the upper shoulder 312. At the additional cross section 512 of the first portion 328, the lower shoulder 316 has a width, seventh width W7, and a height, fourth height H4.

Table II below gives sample dimensions of the first portion 328 of the second segment 324 of the compression region 204.

TABLE II

Sample dimensions of the second segment 324 of the compression region 204

| Dimension | Sample Values | Range |
|---|---|---|
| L2 | 50 µm | 30-80 µm |
| L3 | 60 µm | 30-90 µm |
| H3 | 730 nm | 500-900 nm |
| H4 | 220 nm | 150-300 nm |
| W5 | 100, 150 nm | 100-300 nm |
| W6 | 400, 600 nm | 200-800 nm |
| W7 | 400 nm | 200-600 nm |

Figure 6:
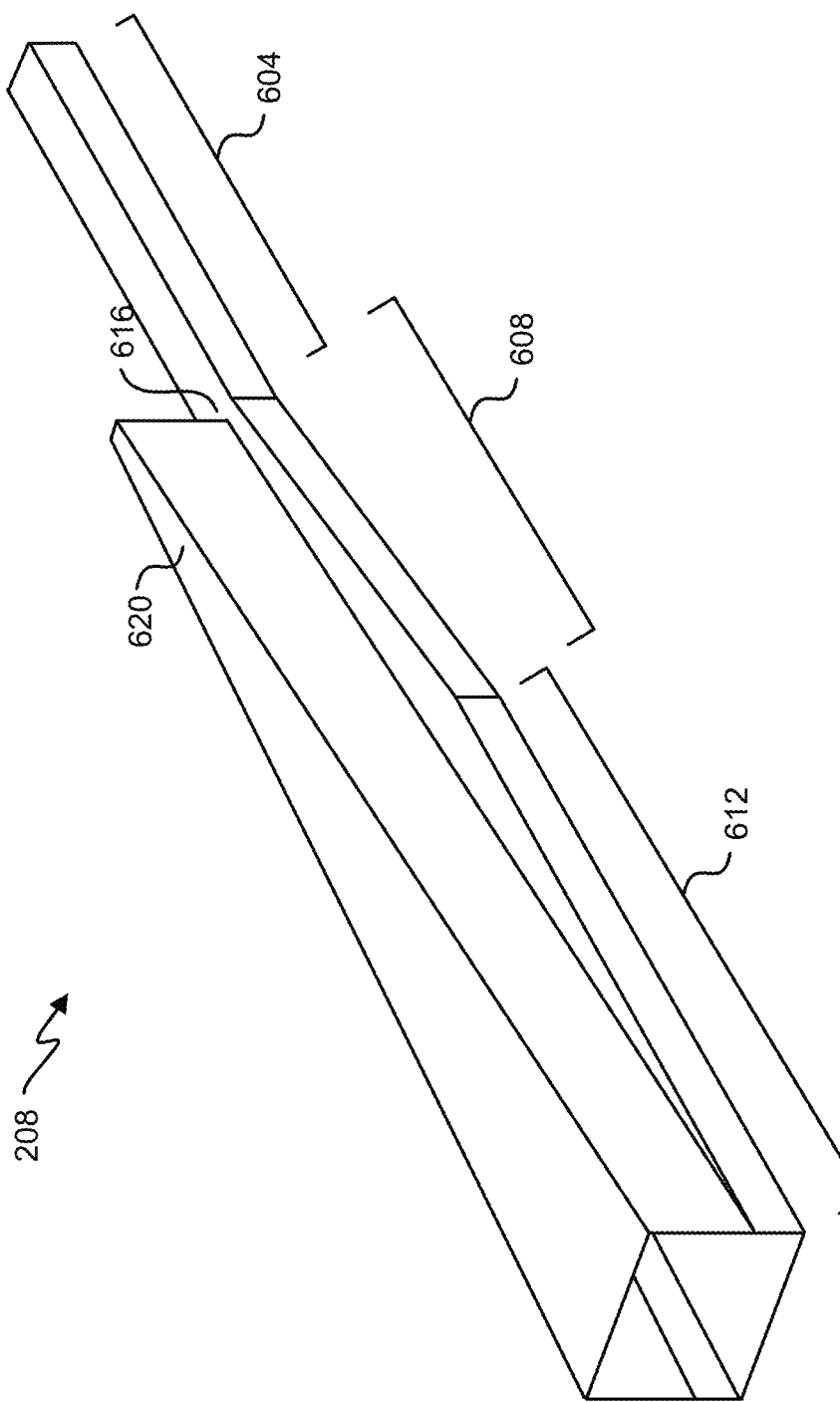
FIG. 6 depicts a simplified view of an embodiment of the expansion region of the optical coupler having a first part, a second part, and a third part.

Referring to FIG. 6, a simplified view of an embodiment of the expansion region 208 of the coupler 104 is shown. The expansion region 208 comprises a first part 604, a second part 608, and a third part 612. The second part 608 is disposed between the first part 604 and the third part 612. A shoulder 616 of the expansion region 208 runs a length of the expansion region 208 from the first part 604 to the third part 612. In the first part 604, the shoulder 616 of the expansion region 208 has a constant width. In the second part 608, the shoulder 616 of the expansion region 208 tapers (a widening taper to expand a beam). In the third part 612, the shoulder 616 of the expansion region 208 has a constant width. A ridge 620 of the expansion region 208 tapers (a widening taper) in the second part 608 and the third part 612.

Figure 7B:
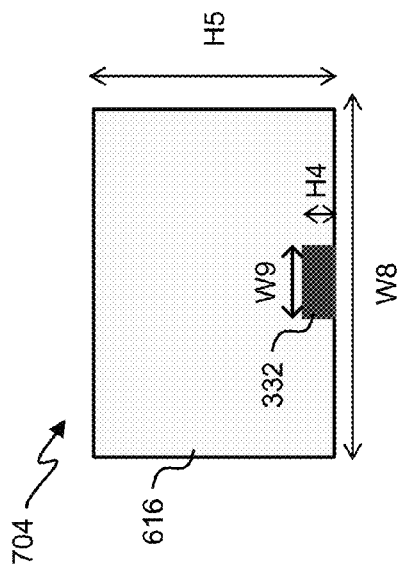
FIG. 7B depicts a cross section of an embodiment of an input end of the first part of the expansion region.
Figure 7C:
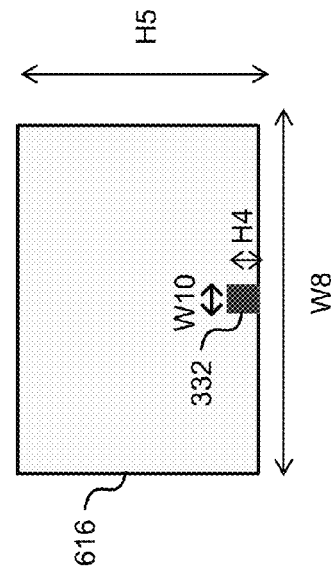
FIG. 7C depicts a cross section of an embodiment of an output end of the first part of the expansion region 208.
Figure 7A:
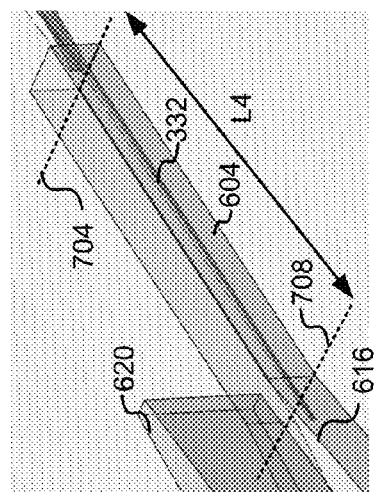
FIG. 7A depicts a perspective view an embodiment of the first part of the expansion region.

FIGS. 7A-7C depict views of an embodiment of the first part 604 of the expansion region 208. FIG. 7A depicts a perspective view of an embodiment of the first part 604 of the expansion region 208. The first part 604 of the expansion region 208 has a near end 704 and far end 708. The first part 604 is shown comprising the shoulder 616 of the expansion region 208 but does not comprise the ridge 620 of the expansion region 208. Further, the first part 604 of the expansion region 208 overlaps the second portion 332 of the second segment 324 of the compression region 204. A distance between the near end 704 of the first part 604 and the far end 708 of the first part 604 is shown as a fourth length, L4.

In some embodiments, the expansion region 208 is made of SiON with refractive index of 1.51. In some embodiments, the refractive index of the SiON is altered to match, or nearly match, a refractive index of different optical fibers, or to match an effective index of a guided mode in an optical fiber (e.g., n=1.47 for matching to Corning SMF-28 optical fiber). In some embodiments, material is used for the expansion region 208 having an index of refraction ranging from 1.47 to 2.1 (e.g., 1.49, 1.51, 1.53, 1.55, 1.57). In some embodiments, the expansion region 208 is made of SiN (having a refractive index of 1.9-2.1, depending on a wavelength of light), Spin-on-glass or polymer. In some embodiments, forming the expansion region 208 of a material with similar refractive index of the optical fiber 112 eliminates a step of placing an anti-reflective coating on the coupler 104. In some embodiments, the expansion region 208 comprises a material that has a lower index of refraction than material in the second portion 332 of the compression region 204, so that light is guided in the second portion 332 of the compression region 204. In some embodiments, having a lower index of refraction in the expansion region 208 allow a beam to expand more slowly (e.g., adiabatically) than if the expansion region 208 had a refractive index that matched the compression region 204. In some embodiments, as the width the second portion 332 of the compression region 204 narrows, less power is confined in the second portion 332 of the compression region 204 and more power transitions (e.g., as part of an evanescent wave) into the first part 604 of the expansion region 208.

FIG. 7B depicts a cross section of an embodiment of the input end 704 of the first part 604 of the expansion region 208. The cross section of the input end 704 of the first part 604 of the expansion region 208 comprises the shoulder 616 of the expansion region 208 and the second portion 332 of the compression region 204. At the input end 704 of the first part 604, the shoulder 616 of the expansion region 208 has a width, eighth width W8, and a height, fifth height H5. At the input end 704 of the first part 604, the second portion 332 of the compression region 204 has a width, ninth width W9, and a height, fourth height H4. The second portion 332 of the compression region 204 is on a floor (e.g., next to a substrate) of the shoulder 616 of the expansion region 208.

FIG. 7C depicts a cross section of an embodiment of the output end 708 of the first part 604 of the expansion region 208. The cross section of the output end 708 of the first part 604 of the expansion region 208 comprises the shoulder 616 of the expansion region 208 and the second portion 332 of the compression region 204. At the output end 708 of the first part 604, shoulder 616 of the expansion region 208 has a width, eighth width W8, and a height, fifth height H5. At the output end 708 of the first part 604, the second portion 332 of the compression region 204 has a width, tenth width W10, and a height, fourth height H4. The second portion 332 of the compression region 204 is on a floor (e.g., next to a substrate) of the shoulder 616 of the expansion region 208. In some embodiments, the second portion 332 of the compression region 204 tapers to a minimum width (e.g., W10), and then continues through the second part 608 and/or the third part 612 of the expansion region 208.

In some embodiments, the second portion 332 of the compression region 204 terminates within the first part 604 of the expansion region 208. In some embodiments, the second portion 332 of the compression region 204 continues into the second part 608 of the expansion region 208.

The embodiment in FIGS. 7A-7C show that the first part 604 of the expansion region 208 has a constant cross section. In some embodiments, first part 604 of the expansion region 208 tapers vertically and/or horizontally as a function of length. For example, in some embodiments the near end 704 of the first part 604 is narrower than the far end 708 of the first part 604. In some embodiments, one or more additional tapering stages are added. For example, the first part 604 is divided into a top portion and a bottom portion, wherein the top portion of the first part 604 tapers and the bottom portion of the first part 604 does not taper.

Table III below gives sample dimensions of the first part 604 of the expansion region 208 and the second portion 332 of the compression region 204.

TABLE III

Sample dimensions of the first part 604 of the expansion region 208 and the second portion 332 of the compression region 204

| Dimension | Sample Values | Range |
| --- | --- | --- |
| L4 | 200 μm | 150-350 μm |
| H5 | 3 μm | 2.5-3.5 μm |
| W8 | 3 μm | 2.5-4.5 μm |
| W9 | 400 nm | 200-600 nm |
| W10 | 100, 120 nm | 80-150 nm |

FIGS. 8A-8D depict views of an embodiment of the second part 608 of the expansion region 208 and the third part 612 of the expansion region 208. FIG. 8A depicts a perspective view an embodiment of the second part 608 of the expansion region 208 and the third part 612 of the expansion region 208. FIG. 8B depicts a top view of an embodiment of the second part 608 of the expansion region 208 and the third part 612 of the expansion region 208. The second part 608 of the expansion region 208 has a near end 804; and the third part 612 of the expansion region 208 has a far end 808. A length of the second part 608 is shown as a fifth length L5. A length of the third part 612 is shown as a sixth length L6.

The shoulder 616 of the expansion region 208 is shown tapering in the second part 608. The shoulder 616 of the expansion region 208 is shown having a constant width in the third part 612. The ridge 620 of the expansion region 208 is shown tapering across both the second part 608 and the third part 612.

FIG. 8C depicts a cross section of an embodiment of the input end 804 of the second part 608 of the expansion region 208. The cross section of the input end 804 of the second part 608 comprises the shoulder 616 of the expansion region 208 and the ridge 620 of the expansion region 208. At the input end 804 of the second part 608, the shoulder 616 of the expansion region 208 has a width, eighth width W8, and a height, fifth height H5. At the input end 804 of the second part 608, the ridge 620 of the expansion region 208 has a width, eleventh width W11, and a height, sixth height H6. In some embodiments, W11 is 1.00 μm±0.05 μm, ±0.10 μm, or ±0.20 μm.

FIG. 8D depicts a cross section of an embodiment of the output end 808 of the third part 612 of the expansion region 208. At the output end 808 of the third part 612 the shoulder 616 of the expansion region 208 and the ridge 620 of the expansion region 208 are indistinguishable from each other. The cross section at the output end 808 of the third part 612 has a height, seventh height, H7, and a width, twelfth width W12.

FIG. 8E depicts a cross section of another embodiment of the output end of the third part 612 of the expansion region 208. At the output end of the another embodiment, the shoulder 616 of the expansion region 208 has width that is wider than a width of the ridge 620 of the expansion region 208. At the output end of the third part 612 in the another embodiment, the ridge 620 of the expansion region 208 has a width, thirteenth width W13, and a height, sixth height H6. At the output end of the third part 612 in the another embodiment, the shoulder 616 of the expansion region 208 has a width, twelfth width W12, and a height, fifth height H5. A ledge 812 is formed on both sides of the expansion region 208 because the shoulder 616 of the expansion region 208 is wider than the ridge 620 of the expansion region 208. The ledge 812 has a width, fourteenth width W14, such that W13+2×W14=W12. In some embodiments, the ledge 812 is formed because of manufacturing tolerances.

The shoulder 616 of the expansion region 208 is considered a first stage and the ridge 620 of the expansion region 208 is considered a second stage. In some embodiments, only two stages are used to make the coupler 104 more easily manufactured, but additional stages could be used to couple to thicker waveguides 108 and/or optical fibers 112.

Table IV below gives sample dimensions of the second part 608 of the expansion region 208 and the third part 612 of the expansion region 208.

TABLE IV

Sample dimensions of the second part 608 of the expansion region 208 and the third part 612 of the expansion region 208.

| Dimension | Sample Values | Range |
| --- | --- | --- |
| H6 | 7 μm | 5.5-9.5 μm |
| H7 | 10 μm | 8-13 μm |
| L5 | 100, 150 μm | 80-300 μm |
| L6 | 250, 300 μm | 200-500 μm |
| W11 | 1 μm | 0.8-1.2 μm |
| W12 | 12 μm | 8-14 μm |
| W13 | 10, 11 μm | 9-11.4 μm |
| W14 | 0.5, 1 μm | 0.3-1.5 μm |

Figure 9:
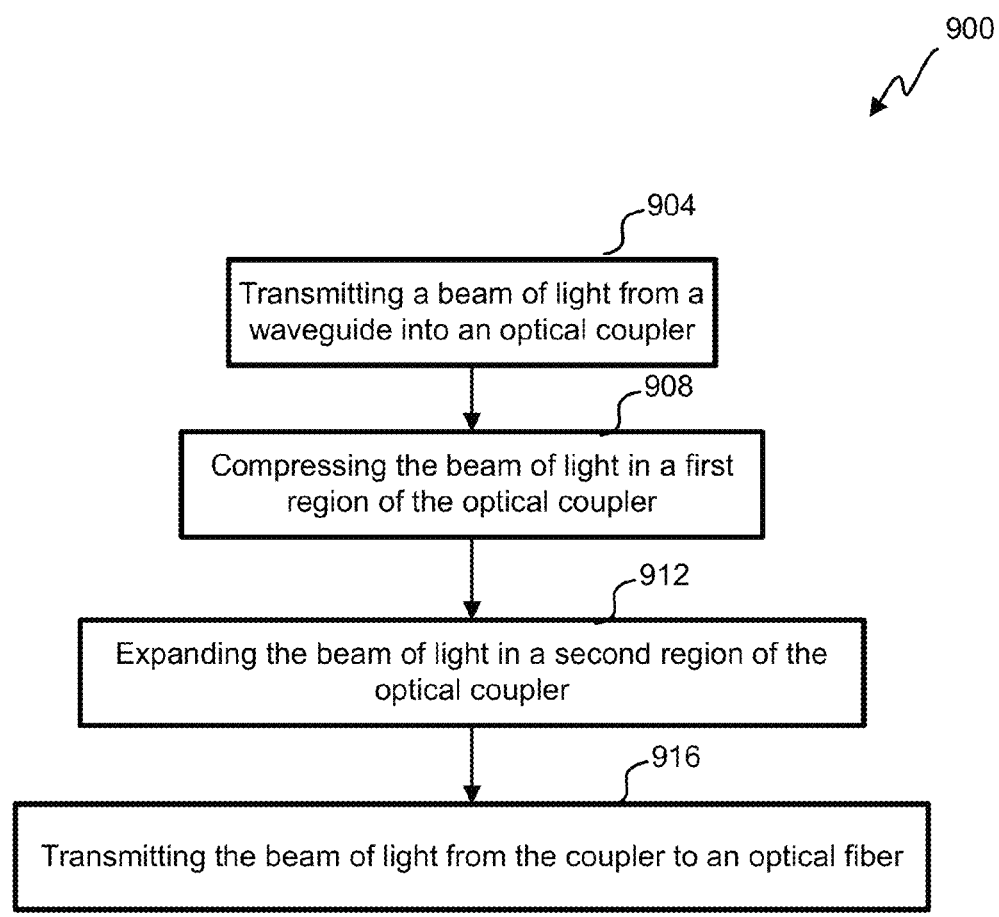
FIG. 9 illustrates a flowchart of an embodiment of a process for using the optical coupler to connect a semiconductor waveguide to an optical fiber.

FIG. 9 illustrates a flowchart of an embodiment of a process for using the optical coupler (e.g., coupler 104) to connect a semiconductor waveguide (e.g., waveguide 108) to an optical fiber 112. The process begins in step 904 transmitting a beam of light from the waveguide 108 into the coupler 104. In some embodiments, the beam of light is generated by a laser and/or gain medium embedded in the wafer as described in U.S. application Ser. No. 12/903,025, filed on Oct. 10, 2010, which is incorporated by reference.

In step 908 the beam of light is compressed in a first region (e.g., compression region 204) of the coupler 104. In step 912, the beam of light is expanded in a second region (e.g., expansion region 208) of the coupler 104. In step 916 the beam of light is then transmitted from the coupler 104 into the optical fiber 112.

Figure 10:
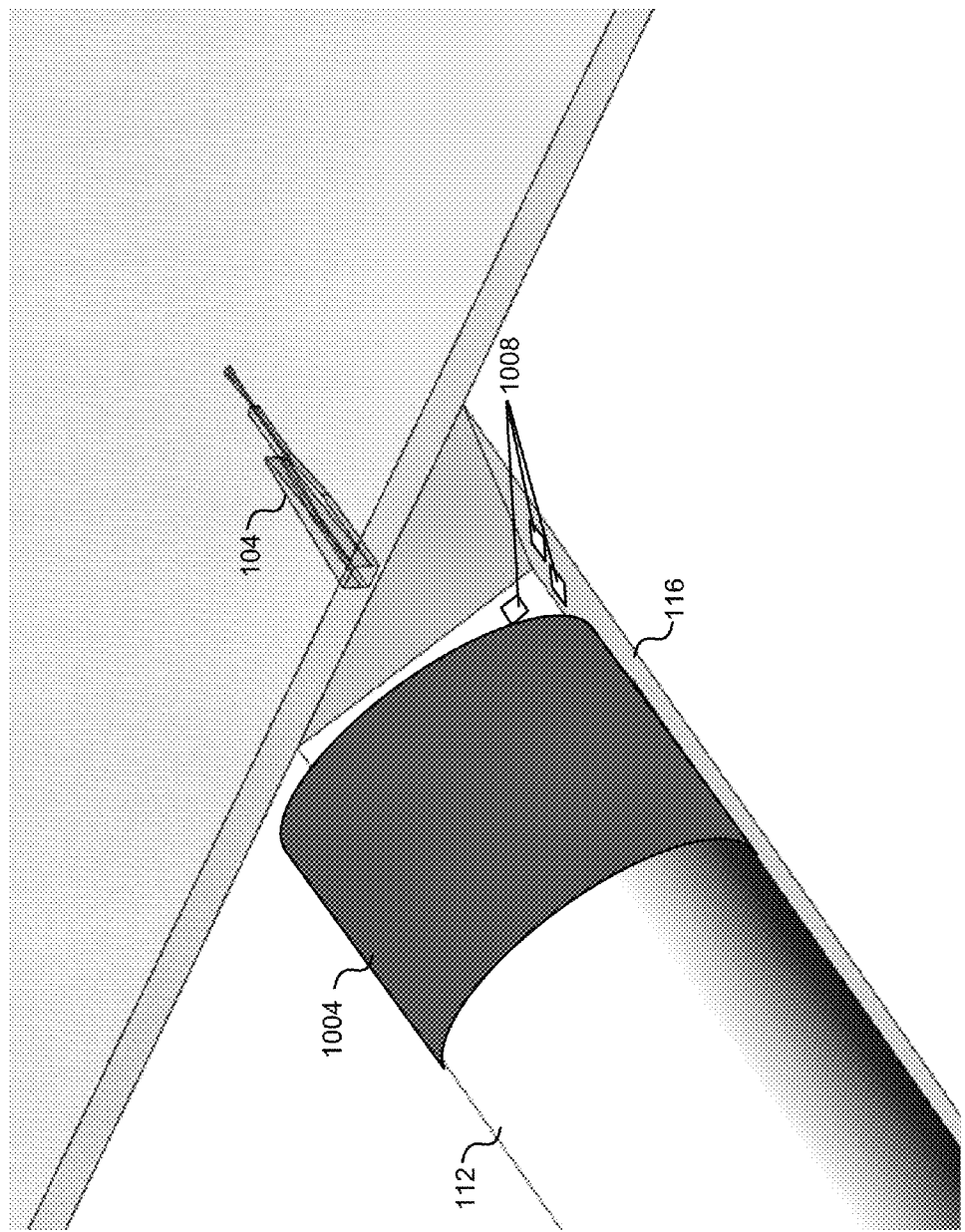
FIG. 10 depicts a simplified view of an embodiment of an optical fiber with a ferrule and a v-groove with embedded metal.

FIG. 10 depicts a simplified view of an embodiment of an optical fiber 112 with a ferrule 1004 and a v-groove 116 with one or more metal pieces 1008. In some embodiments, the optical fiber 112 is fixed in place by melting the one or more metal pieces 1008 (e.g., using an electric current that is injected into a resistor and/or the one or more metal pieces 1008 themselves acting as a resistor; and/or applying heat to the one or more metal pieces 1008). In some embodiments, the one or more metal pieces 1008 are embedded in the v-groove 116. In some embodiments, the one or more metal pieces 1008 are buried in the v-groove 116. Possible metals includes In, InPd, InAu, Au, AuSn, Sn, Cu, Ag, Bi, Zn, and Sb. In some embodiments, the one or more metal pieces 1008 comprise a metal layer that is placed in the v-groove 116 between the ferrule 1004 and v-groove 116. The metal layer placed in the v-groove 116 is heated so that the metal layer welds the optical fiber 112 in the v-groove 116.

Figure 11:
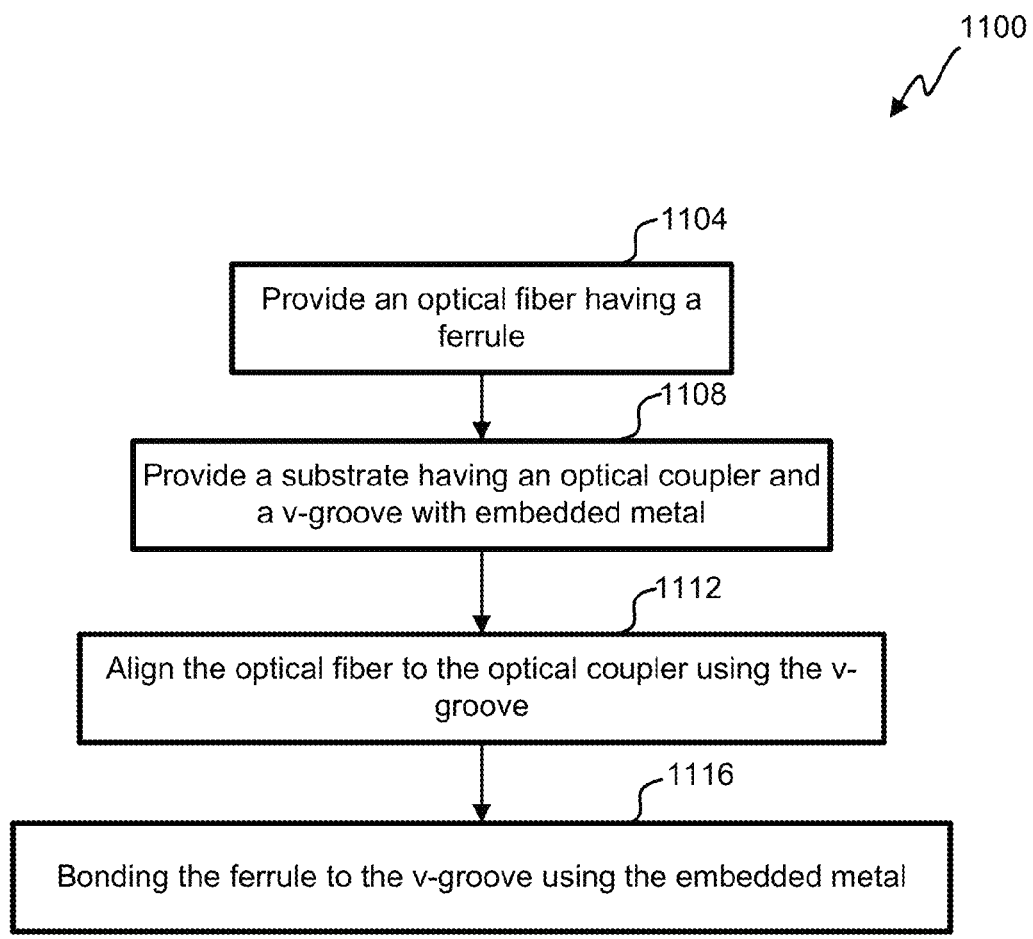
FIG. 11 illustrates a flowchart of an embodiment of a process for securing an optical fiber in a v-groove using embedded metal.

FIG. 11 illustrates a flowchart of an embodiment of a process 1100 for securing an optical fiber 112 in a v-groove 116 using one or more metal pieces 1008. The process 1100 begins in step 1104 where an optical fiber 112 having a ferrule 1004 is provided. In step 1108, a substrate is provided having an optical coupler (e.g., coupler 104) and a v-groove 116 with the one or more metal pieces 1008 in the v-groove 116. In some embodiments, the one or more metal pieces 1008 are embedded in the v-groove 116. In step 1112, the optical fiber 112 is aligned to the optical coupler using the v-groove 116. In step 1116, the ferrule 1004 is bonded to the v-groove 116 using the one or more metal pieces 1008 (e.g., by heating and/or applying current to the one or more metal pieces 1008).

It is to be understood that though embodiments are directed to specific examples, the specific examples are not meant to limit the scope of this disclosure. Further, lengths of the different regions and segments can be elongated or shortened such that the cumulative length of the coupler 104 ranges between 0.25 and 3 millimeters. Additionally, though many shown embodiments of the coupler 104 are linear, in some embodiments the coupler 104 bends and/or bends back on itself (e.g., a bend placed between the first portion 328 of the compression region 204 and the second portion 332 of the compression region 204). In some embodiments, the coupler 104 has a compression region 204 and an expansion region 208 to provide better confinement and/or enable better coupling tolerances between the coupler 104 and the optical fiber 112. It is noted that as the coupler 104 couples light from the waveguide 108 into the optical fiber 112, it would couple in the reverse direction, coupling light from the optical fiber 112 into the waveguide 108.

Though embodiments above use SiON, other materials may be used. For example, epoxies, photoresists, SiN, and/or SiO2 could be used as substitutes for SiON.

Additionally, though the specification refers to the waveguide 108 and/or the coupler 104 being formed of certain material, the specification generally refers to material for a core, not a cladding. In some embodiments, silicon is used because of ease of manufacturing. In some embodiments, crystalline silicon is used because there is less optical loss in crystalline silicon than in both amorphous silicon and poly-crystalline silicon. However, in some embodiments, portions of the coupler 104 are made of amorphous silicon, poly-crystalline silicon, and/or other material for fabrication reasons. In some embodiments, W3, W5, and W10 (tip widths) are less than 250 nm and/or less than 200 nm to reduce transmission loss for optical beams having a wavelength in the range of 1300 nm to 1600 nm. Optical loss becomes greater for widths of W3, W5, and W10 that are greater than 200 and/or 250 nm. In some embodiments, tip width is made so that there is greater than 80%, 85%, 90%, or 95% transmission from a tip. In some embodiments, waveguiding portions are inserted between elements of the coupler 104.

While the principles of the disclosure have been described above in connection with specific apparatuses and methods, it is to be clearly understood that this description is made only by way of example and not as limitation on the scope of the disclosure.

What is claimed is:

1. A waveguide coupler for transmitting light between a silicon waveguide and an optical fiber, the coupler comprising:
   a compression region, the compression region operable to:
   receive an optical beam from a semiconductor waveguide,
   compress the optical beam to have a smaller cross section compared to light confined in the semiconductor waveguide; and
   transmit optical beam to an expansion region;
   the expansion region, wherein:
   the expansion region comprises a first part;
   the first part overlaps, and is directly adjacent to, at least a portion of the compression region; and
   the expansion region is operable to:
   receive the optical beam from the compression region;
   expand the optical beam to have a larger cross section compared to light confined in the semiconductor waveguide; and
   transmit the optical beam to the optical fiber.

2. The coupler for transmitting light between the silicon waveguide and the optical fiber of claim 1, wherein the compression region comprises a shoulder and a ridge, and the shoulder and the ridge both compress the optical beam.

3. The coupler for transmitting light between the silicon waveguide and the optical fiber of claim 2, wherein the ridge terminates at a first tip having a width equal to or less than 225 nanometers and the shoulder terminates at a second tip having a width less than or equal to 225 nanometers.

4. The coupler for transmitting light between the silicon waveguide and the optical fiber of claim 3, wherein the second tip has a width less than or equal to 175 nanometers.

5. The coupler for transmitting light between the silicon waveguide and the optical fiber of claim 1, wherein the first part and the at least a portion of the compression region are made of different materials.

6. The coupler for transmitting light between the silicon waveguide and the optical fiber of claim 1, wherein the first part has a cross section between 2.5 microns and 3.5 microns and has a height between 2.5 microns and 3.5 microns.

7. The coupler for transmitting light between the silicon waveguide and the optical fiber of claim 1, wherein the expansion region adiabatically expands the optical beam received from the compression region as the optical beam is guided to the optical fiber.

8. The coupler for transmitting light between the silicon waveguide and the optical fiber of claim 1, wherein the compression region adiabatically compresses the optical beam received from the semiconductor waveguide.

9. The coupler for transmitting light between the silicon waveguide and the optical fiber of claim 1, wherein:
the compression region comprises a first material having a first index of refraction;
the expansion region comprises a second material having a second index of refraction; and
the first index of refraction is greater than the second index of refraction.

10. The coupler for transmitting light between the silicon waveguide and the optical fiber of claim 1, wherein the expansion region comprises:
a shoulder, the shoulder having:
a first part, wherein the first part is not tapered;
a second part, wherein the second part is tapered to laterally expand or compress the optical beam; and
a third part, wherein:
the second part is disposed between the third part and the first part; and
the shoulder in the first part is not tapered;
a ridge, wherein:
the ridge extends over top of the second part and the third part; and
the ridge tapers to laterally expand or compress the optical beam.

11. An expansion region for use in a coupler for guiding light between a silicon waveguide and an optical fiber, expansion region comprising:
a first waveguide portion having:
a first part, wherein the first part is not tapered;
a second part, wherein the second part is tapered to laterally expand or compress light; and
a third part, wherein:
the second part is disposed between the third part and the first part; and
the first waveguide portion in the third part is not tapered;
a second waveguide portion, wherein:
the second waveguide portion extends over top of the second part and the third part;
the second waveguide portion is directly adjacent to the second part and the third part of the first waveguide portion; and
the second waveguide portion tapers to laterally expand or compress light.

12. The expansion region for use in the coupler for guiding light between the silicon waveguide and the optical fiber of claim 11, wherein:
the third part has a first end and a second end;
the second end is connected to the second part;
the first end is used as an input/output of the coupler;
the second waveguide portion has a width at the first end;
the first waveguide portion has a width at the first end; and
the width of the first waveguide portion at the first end is wider than the width of the second waveguide portion at the first end.

13. The expansion region for use in the coupler for guiding light between the silicon waveguide and the optical fiber of claim 12, wherein the width of the first waveguide portion at the first end is 0.6 to 3.0 microns wider than the width of the second waveguide portion at the first end.

14. The expansion region for use in the coupler for guiding light between the silicon waveguide and the optical fiber of claim 11, the expansion region comprises SiON or SiN.

15. The expansion region for use in the coupler for guiding light between the silicon waveguide and the optical fiber of claim 11, the expansion region has refractive index that matches a refractive index, or effective refractive index, of the optical fiber.

16. The expansion region for use in the coupler for guiding light between the silicon waveguide and the optical fiber of claim 11, the expansion region comprises SiON or SiN.

17. The expansion region for use in the coupler for guiding light between the silicon waveguide and the optical fiber of claim 11, wherein the first part of the first waveguide portion overlaps a portion of a compression region of the coupler.

18. A method for coupling a semiconductor waveguide to an optical fiber, the method comprising:
transmitting a beam of light from a waveguide into an optical coupler;
compressing the beam of light received from the waveguide in a first region of the optical coupler;
expanding the beam of light in a second region of the optical coupler after compressing the beam of light in the first region, wherein the first region and the second region are adjacent; and
transmitting the beam of light from the optical coupler to an optical fiber after expanding the beam of light in the second region of the optical coupler.

19. The method for coupling the semiconductor waveguide to the optical fiber of claim 18, wherein:
the second region overlaps at least a portion of the first region;
the first region comprises a first material having a first index of refraction;
the second region comprises a second material having a second index of refraction; and
the first index of refraction is greater than the second index of refraction.

* * * * *